(12) United States Patent
Mishra et al.

(10) Patent No.: US 10,320,734 B1
(45) Date of Patent: Jun. 11, 2019

(54) SOCIAL MATCHING

(75) Inventors: Arvind Mishra, Encino, CA (US); Jonathan Eppers, West Hollywood, CA (US); Gregory Steiner, Santa Monica, CA (US); Joseph Essas, Los Angeles, CA (US)

(73) Assignee: eHarmony, Inc., Santa Monica, CA (US)

( * ) Notice: Subject to any disclaimer, the term of this patent is extended or adjusted under 35 U.S.C. 154(b) by 467 days.

(21) Appl. No.: 13/363,194

(22) Filed: Jan. 31, 2012

Related U.S. Application Data

(60) Provisional application No. 61/551,396, filed on Oct. 25, 2011.

(51) Int. Cl.
*H04L 12/58* (2006.01)
*H04L 29/06* (2006.01)

(52) U.S. Cl.
CPC ............ *H04L 51/32* (2013.01); *H04L 65/403* (2013.01)

(58) Field of Classification Search
CPC .............................. H04L 51/32; H04L 65/403
USPC .......................................................... 709/204
See application file for complete search history.

(56) References Cited

U.S. PATENT DOCUMENTS

| | | | | |
|---|---|---|---|---|
| 7,085,806 B1 * | 8/2006 | Shapira | .................. | G06Q 30/08 705/1.1 |
| 7,467,212 B2 * | 12/2008 | Adams | .................... | G06F 9/468 709/206 |
| 7,885,902 B1 * | 2/2011 | Shoemaker | ............ | G06Q 10/10 705/1.1 |
| 8,195,668 B2 * | 6/2012 | Drennan | ................ | G06Q 50/01 705/319 |
| 8,250,096 B2 * | 8/2012 | Su et al. | ........................ | 707/783 |
| 2003/0069752 A1 * | 4/2003 | LeDain | ............... | G06F 19/3418 705/2 |
| 2008/0201447 A1 * | 8/2008 | Kim | ........................ | G06Q 50/01 709/218 |
| 2009/0030985 A1 * | 1/2009 | Yuan | ..................... | H04L 67/306 709/204 |
| 2010/0293476 A1 * | 11/2010 | Rosenblum | ......... | H04L 12/6418 715/753 |
| 2013/0024391 A1 * | 1/2013 | Vakil | .................. | G06Q 30/0282 705/319 |
| 2013/0091280 A1 * | 4/2013 | Rajakarunanayake | ...................... | G06Q 50/01 709/225 |

* cited by examiner

*Primary Examiner* — Kevin T Bates
*Assistant Examiner* — Emad Siddiqi
(74) *Attorney, Agent, or Firm* — Van Pelt, Yi & James LLP

(57) ABSTRACT

In some embodiments, social matching includes determining one or more friends of a subscriber, in which the one or more friends of the subscriber are associated with the subscriber based on a social graph; notifying (e.g., pinging) a selected set of the one or more friends of the subscriber for input regarding selected matches for the subscriber, in which matches for the subscriber are generated by a matching engine performed by a processor; and displaying the input received from the selected set of the one or more friends of the subscriber.

20 Claims, 15 Drawing Sheets

SOCIAL MATCHING

CROSS REFERENCE TO OTHER APPLICATIONS

This application claims priority to U.S. Provisional Patent Application No. 61/551,396, entitled SOCIAL MATCHING, filed Oct. 25, 2011, which is incorporated herein by reference for all purposes.

BACKGROUND OF THE INVENTION

Online dating services or Internet dating services exist that allow individuals, couples, and groups to contact and communicate with each other over the Internet. For example, an individual may use an online dating service to meet new persons to develop new personal relationships. Online dating services generally attempt to facilitate matchmaking over the Internet, through the use of personal computers, tablet computers, cell/smart phones, and/or other network enabled computing devices.

BRIEF DESCRIPTION OF THE DRAWINGS

Various embodiments of the invention are disclosed in the following detailed description and the accompanying drawings.

DETAILED DESCRIPTION

Figure 1:
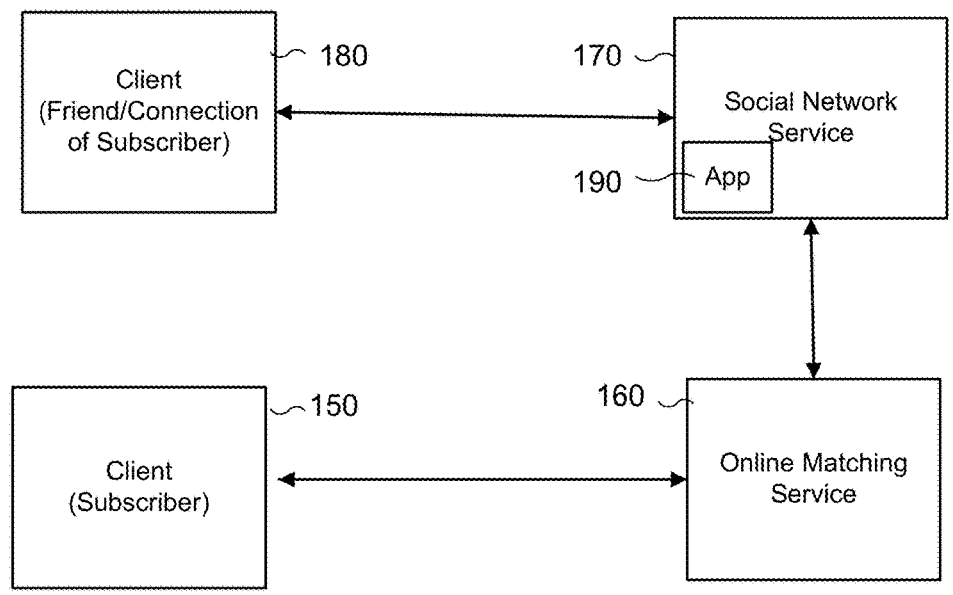
FIG. 1 is a network architecture diagram for social matching in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Matching services (e.g., online dating services or Internet dating services) generally refer to matching platforms and network services that allow individuals, couples, and groups to contact and communicate with each other over the Internet. For example, an individual may use an online matching service to meet new persons to develop new personal relationships with the objective of entering into a long term relationship. Online matching services generally attempt to facilitate matchmaking over, for example, the Internet, through the use of personal computers, tablet computers, cell/smart phones, and/or other network enabled computing devices. Some online matching services offer additional services, such as webcasts, online chat, telephone chat (VOIP), video chat/conferencing, and message boards. Some online matching services are subscription based and, for example, require a monthly fee, some online matching services utilize on advertising for their revenue, and some online matching services utilize a combination of subscription based and ad based revenue models and/or other revenue models.

Online matching services generally require users to provide personal information about themselves. In some online matching services, the users can also search the service provider's data store (e.g., database) for other individuals using various criteria, such as age range, gender, interests, and location. Some online matching services also allow members to upload photos and/or videos of themselves and browse the photos and videos of other participating users.

Online matching services use a variety of automated techniques (e.g., matchmaking engines) to match subscribers to other subscribers. For example, eHarmony, Inc. (www.eHarmony.com) has subscribers fill out a relationship questionnaire and then matches people based on a plurality of dimensions and statistically proven models of compatibility. Put another way, the eHarmony system automatically generates matches by estimating the likely success of a match between two people as a potential long term relationship. Although the candidates presented to a person are defined as good matches (e.g., based on previous research, there must be a strong likelihood of a successful, long term relationship between a person being matched and a candidate for a match to be created), techniques to further improve the matching system which work to increase levels of match acceptance would be desirable.

What is needed is social matching to further improve matching services. Accordingly, various techniques for social matching are disclosed herein. In some embodiments, social matching provides for a collaborative matching experience while maintaining desired privacy controls for users (e.g., subscribers, which as used herein refers to users of, for example, an online matching service) of an online matching service using various techniques described herein.

In some embodiments, social matching includes determining one or more friends of a subscriber, in which the one or more friends of the subscriber are associated with the subscriber based on a social graph; notifying (e.g., pinging) a selected set of the one or more friends of the subscriber for input regarding selected matches for the subscriber, in which matches for the subscriber are generated by a matching engine performed by a processor; and displaying the input received from the selected set of the one or more friends of the subscriber.

In some embodiments, social matching further includes receiving a friends selection input to identify the selected set of the one or more friends of the subscriber for input regarding selected matches for the subscriber; receiving a match selection input to identify the selected matches for the subscriber to share with the selected set of the one or more friends; pinging the selected set of the one or more friends of the subscriber for input regarding selected matches for the subscriber friends to share the selected set of the one or more friends of the subscriber for input regarding selected matches for the subscriber; and receiving input from the selected set of the one or more friends regarding selected matches.

In some embodiments, social matching further includes evaluating feedback input received from pinged friends of the subscriber; and generating new matches for the subscriber using the evaluated feedback input received from pinged friends of the subscriber as another factor in generating the new matches for the subscriber.

In some embodiments, social matching further includes allowing for a friend of a subscriber to suggest a match for the subscriber that is based on a previous match that had been provided to that friend. In some embodiments, social matching further includes allowing for a friend of a subscriber to suggest a match for the subscriber that is based on another match for which another subscriber had asked that friend for input.

In some embodiments, an online matching service provides an application on one or more social networks, such as for Facebook (e.g., a Facebook application, which provides an integrated application available for users of the Facebook social network platform, as further described at http://developers.facebook.com/docs/guides/canvas/), Google+, LinkedIn, and/or other social networks. Using this approach, as similarly described herein with respect to FIG. 2, subscribers of an online matching service can share matches suggested by the online matching service with their friends on Facebook, who may not be users or subscribers of the online matching service. For example, a subscriber of an online matching service can utilize such an application integrated on a social network to select one or more of their friends on the social network for sharing their matches generated by the online matching service's matching engine. Their friends can then, for example, provide feedback and/or other input to the user regarding such shared matches to the subscriber. Using this approach, their friends would not need to log into the online matching service or themselves be subscribers to the online matching service in order to receive shared matches and/or to provide their input regarding such shared matches. In this manner, sharing matches with friends is easy for both the subscriber and their friends. This approach also allows the subscriber to maintain privacy over their participation on the online matching service by sharing only selected information with selected friends on the social network.

In some embodiments, an online matching service includes a mechanism for a user to integrate one or more social graphs associated with the user (e.g., social graphs associated with a given user on various other social networks), and facilitate a collaborative matching experience with various features utilizing the integrated social graphs for the user. For example, a subscriber of the online matching service can elect to integrate their social graph from Facebook, Google+, LinkedIn, and/or other social networks, such that their friends/contacts list is available for various social matching features described herein (e.g., Facebook provides a public API referred to as the Graph API, available at http://developers.facebook.com/docs/reference/api/, that allows for developers to access the social graph of one or more Facebook users, and various other open/public APIs are similarly available for other social networks). The subscriber can then, for example, select one or more friends for sharing their matches generated by the online matching service's matching engine, so that their friends can, for example, provide feedback and/or other input to the user regarding such matches. In some embodiments, their friends are required to enter login credentials to the online matching service to access the shared matches and provide their feedback (e.g., such pinged friends can be given temporary login credentials to provide such feedback, or allowed to create login credentials for repeated use of such features even if they are not current subscribers, or be required to subscribe in some capacity to the online matching service in order to get such login credentials and to participate in such features/services or to get enhanced access/participation opportunities for such features/services). In some embodiments, their friends are not required to enter login credentials to the online matching service in order to access the shared matches and provide their feedback, and rather, can receive such via a notification (e.g., e-mail, text message, or other electronically communicated notification) or links to a web site service or plug-in via the notification.

In some embodiments, the user specifies one or more groups or circles of friends, which can have different level of access rights to the user's online matching service information. For example, a first circle of friends can provide input to the user's profiles, a second (e.g., larger) circle of friends can view the user's profile, and a third (e.g., even larger) circle of friends can view the user's matches (e.g., suggested matches generated by a match generation engine of the online matching service). In some embodiments, access rights are configurable by the user at an individual and/or group (e.g., circle of friends) level, including, for example, read/view, write/edit, and/or other access writes. In some embodiments, the user can specify sharing based on types of data, such as sharing of photos, contact information, friends/connections, matches, input from other friends regarding matches, selected matches, past selected matches, correspondence with matches, and/or other information.

Accordingly, social matching techniques described herein allow a user of an online matching service to socialize their matches with a select group of the user's friends (e.g., a ping my friends feature for an online matching service). The user's friends can then provide their input regarding the matches (e.g., assist as a date picker or advise the user regarding potential dates or introductions).

Also, many users of online matching services generally want to maintain a great degree of privacy regarding their participation on such online matching services. Accordingly, various social matching techniques described herein allows such user to manage and control various privacy and access settings to restrict access to information related to the user's participation on the online matching service, including, for example, their user profile and suggested matches, while allowing selected friends or connections of other social networks to have user desired access to certain information related to the user's participation on the online matching service.

In some embodiments, a user selects which friends can provide input to the user's profile for an online matching service (e.g., read/view, write/edit, comment, and/or other levels of access).

In some embodiments, a user selects which friends can provide a testimonial (e.g., a reference or recommendation) for an online matching service (e.g., a friend-imonial). In some embodiments, the user can ask a mutual friend or mutual connection of a match to provide a testimonial for their match as suggested by a matching engine for the online matching service (e.g., a date-imonial, which can be a thumbs up, commented or other communication regarding the potential match shared with one or both of the persons in the match, and/or other forms of responses/communications regarding whether the two persons in that suggested match should date or otherwise respond to the suggested match).

In some embodiments, a match engine generates one or more matches for a user (e.g., a subscriber). The user can then view each of the one or more matches. In some embodiments, social matching includes displaying to the user whether they have any friends or connections in common with a given suggested match (e.g., based on social graphs imported from one or more other social networks). In some embodiments, the user can view the common friends or connections. In some embodiments, the user can ping a common friend or connection for input regarding the suggested match. In some embodiments, both the user and the suggested match must agree to allow either person to view common friends or connections and/or to ping common friends and/or connections (e.g., for a friend-imonial or a date-imonial or other input request). For example, the sharing of social graphs with suggested matches can be an opt-in, opt-out, and/or upon individual match requests feature to maintain privacy over their friends and connections within the online matching service network.

FIG. 1 is a network architecture diagram for social matching in accordance with some embodiments. As shown, a client device 150 used by a subscriber is in communication with an online matching service 160 over a network, such as the Internet. The online matching service is also in communication with a social network 170 (e.g., Facebook, Google+, LinkedIn, and/or other social networks) over a network, such as the Internet. Another client device 180 used by a friend/connection of the subscriber is in communication with the social network 170 over a network, such as the Internet.

In some embodiments, an online matching service provides an application accessible via the social network service 170. Using this approach, subscribers of an online matching service can share matches suggested by the online matching service with their friends on Facebook, who may not be users or subscribers of the online matching service. For example, a subscriber of an online matching service can utilize such an application integrated on a social network, shown as a social network application for the online matching service (App) 190, to select one or more of their friends on the social network for sharing their matches generated by the online matching service's matching engine (e.g., which can be securely communicated from the online matching service to the App 190). Their friends, such as friend/connection of subscriber using client device 180, can then, for example, use the App 190 available via the social network service 170 to provide feedback and/or other input to the user regarding such shared matches to the subscriber. Using this approach, their friends would not need to log into the online matching service 160 or themselves be subscribers to the online matching service 160 in order to receive shared matches and/or to provide their input regarding such shared matches. In this manner, sharing matches with friends is easy for both the subscriber and their friends. This approach also allows the subscriber to maintain privacy over their participation on the online matching service 160 by sharing only selected information with selected friends on the social network 170.

In some embodiments, the online matching service 160 receives analytics, reports, and/or other information from the App 190 (e.g., social matching feedback input received from pinged friends of the subscriber), which can then be used to generate improved future matches for the subscriber based on the social matching feedback (e.g., to provide new matches for the subscriber using the evaluated feedback input received from pinged friends of the subscriber as an additional criteria or factor in generating the new matches for the subscriber).

Figure 2:
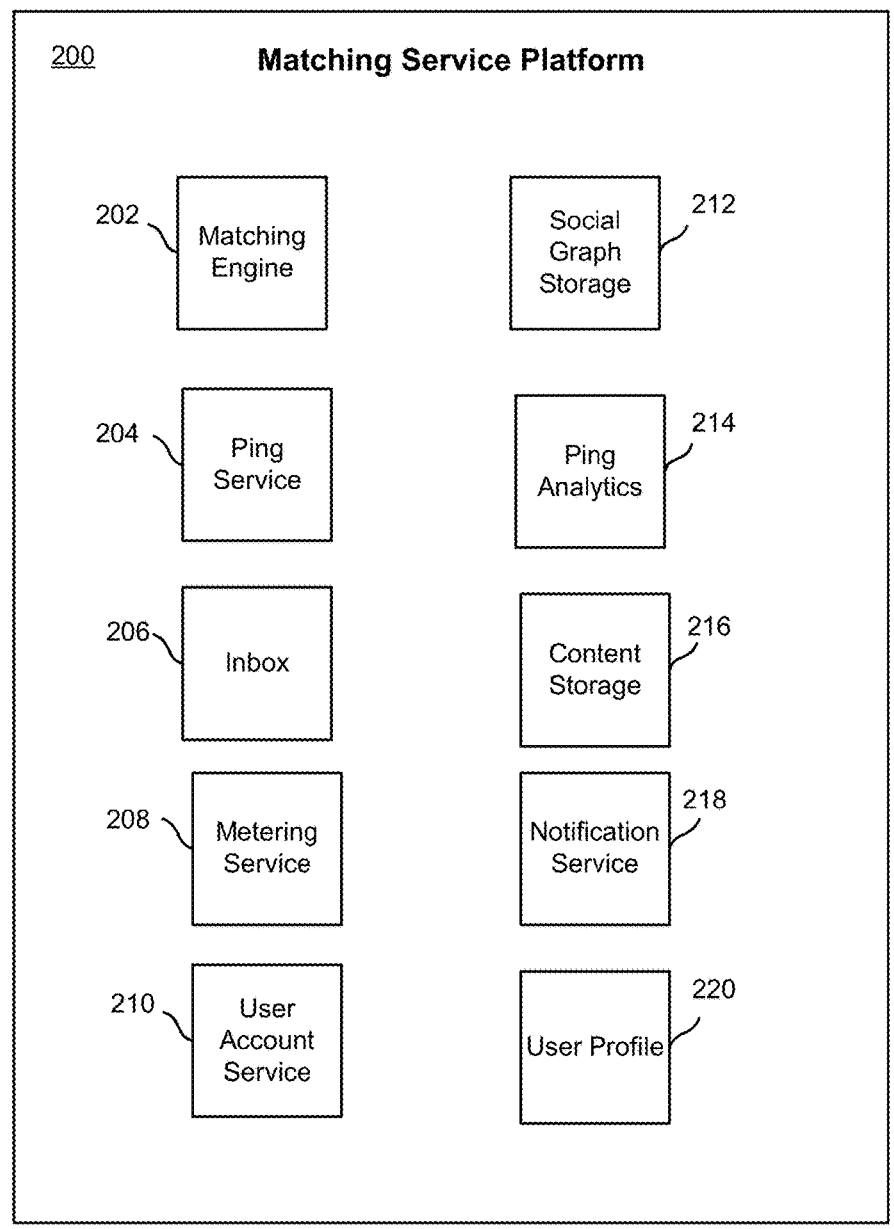
FIG. 2 is a functional logic diagram for a matching service platform for providing social matching in accordance with some embodiments.

FIG. 2 is a functional logic diagram for a matching service platform for providing social matching in accordance with some embodiments. As shown, a matching service platform 200 includes a matching engine 202 for generating matches for subscribers of the matching service. The matching service platform 200 also includes a ping service 204 for providing a ping feature for providing social matching as similarly described herein with respect to various embodiments. The matching service platform 200 also includes an inbox 206, which provides for a queue for messages and/or notifications for each subscriber of the matching service. The matching service platform 200 also includes a metering service 208, which can monitor subscriber/user service usage and/or billing (e.g., for a revenue and/or ad based revenue model implementation). The matching service platform 200 also includes a user account service 210, which can provide for subscriber/user credentials creation/reset and storage. The matching service platform 200 also includes a social graph storage 212, which can store one or more social graphs imported for each subscriber for usage with the ping service 204 as similarly described herein. The matching service platform 200 also includes ping analytics 214, which can maintain ping usage and social matching feedback data, such as for monitoring the effectiveness of the ping feature and/or for using as a feedback loop for match generation for subscribers based on received social matching feedback as similarly described herein. The matching service platform 200 also includes content storage 216, which can include content storage for matches generated by the matching engine 202 for each subscriber. The matching service platform 200 also includes a notification service 218, which can notify subscribers of matches generated by matching engine 202, notify friends/contacts of shared data (e.g., shared user profiles and/or shared matches for social matching feedback input), and/or notify subscribers of received social matching feedback from friends/contacts. The matching service platform 200 also includes a user profile 220, which can store user profile settings for subscribers/users, such as privacy and access controls and/or friends/contacts settings as similarly described herein.

Figure 3:
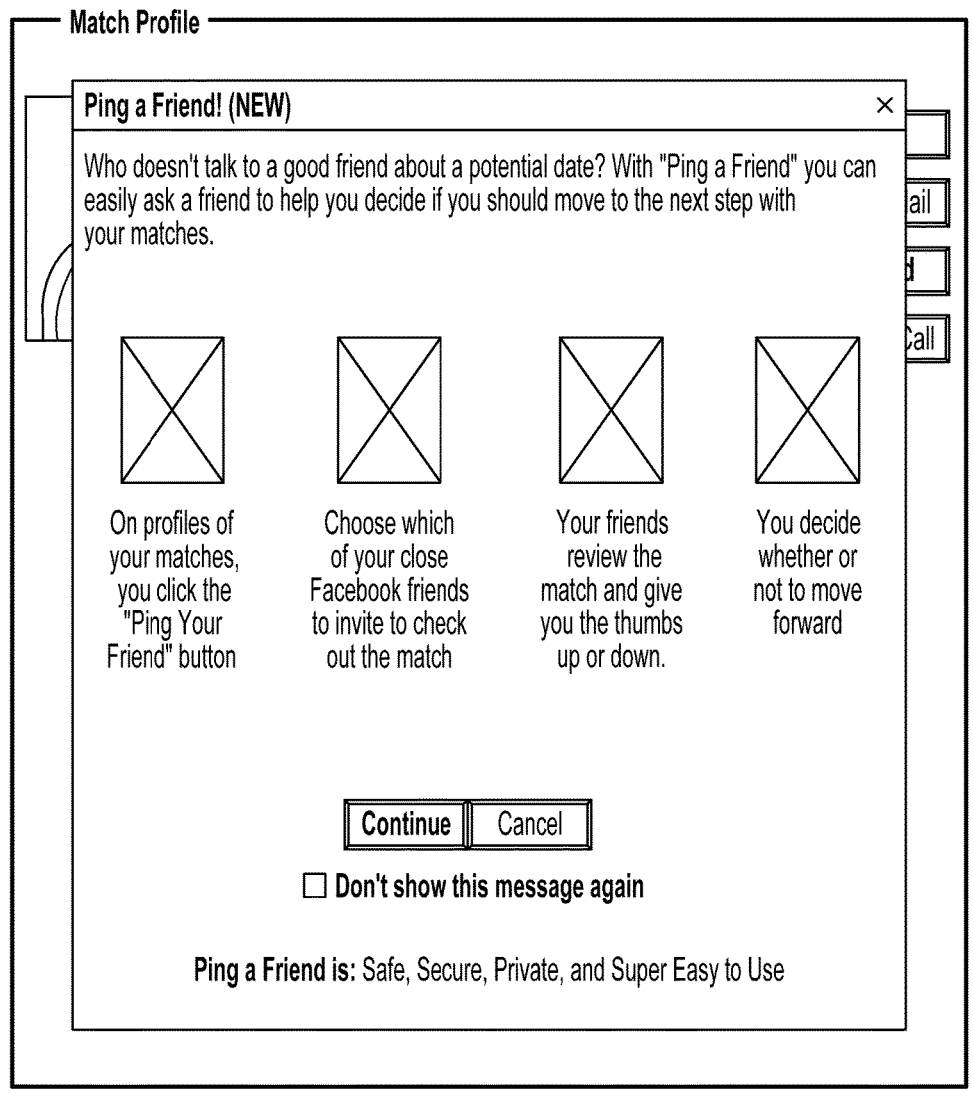
FIG. 3 is a functional screen diagram for social matching in accordance with some embodiments.

FIG. 3 is a functional screen diagram for social matching in accordance with some embodiments. As shown, a ping your friend feature can be setup and provided as an opt-in feature for users/subscribers of an online matching service. In particular, a ping a friend feature for providing social matching allows a subscriber of an online matching service to select matches for sharing via the "Ping Your Friend" button on a profile screen of the subscriber's current matches. The subscriber can select which of their friends on Facebook to invite to view/check out a selected match. The subscriber's selected friends can then review the match and give the match a thumbs up or thumbs down feedback input. The subscriber can then elect to decide how to proceed with that match in view of their friends' feedback.

Figure 4:
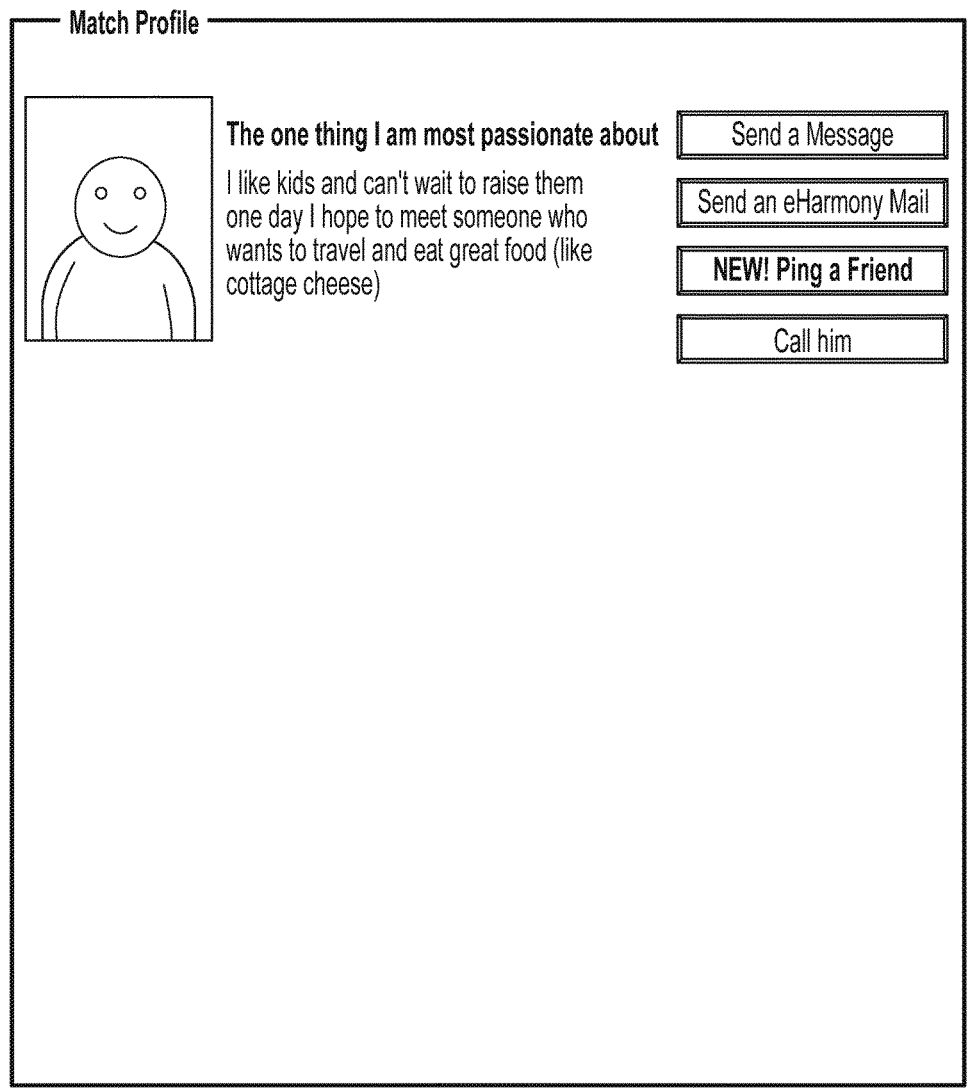
FIG. 4 is a functional screen diagram for social matching in accordance with some embodiments.

FIG. 4 is a functional screen diagram for social matching in accordance with some embodiments. As shown, a match profile screen of an online social matching service includes a "NEW! Ping a Friend" button as similarly described above.

Figure 5:
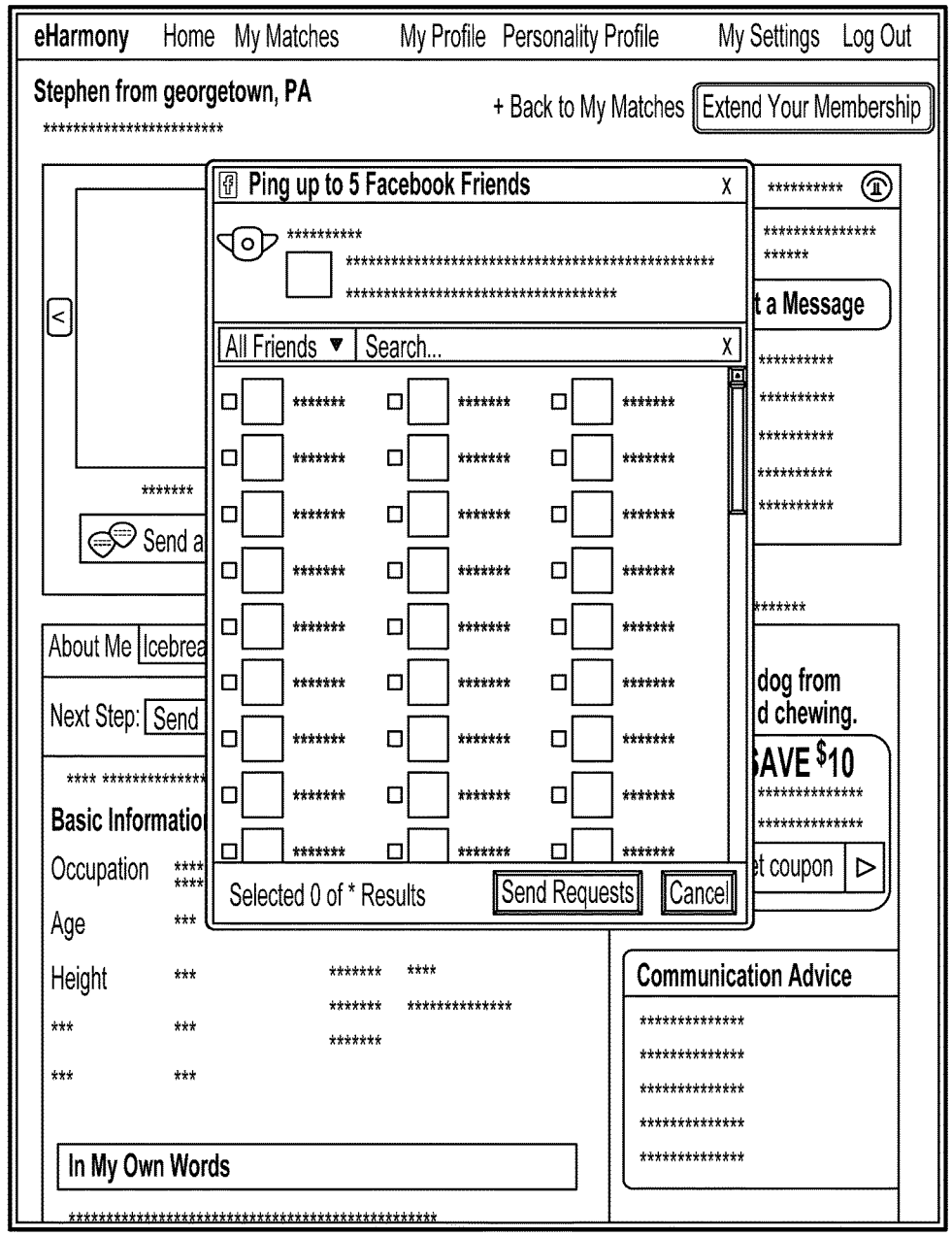
FIG. 5 is a functional screen diagram for social matching in accordance with some embodiments.

FIG. 5 is a functional screen diagram for social matching in accordance with some embodiments. As shown, a screen shot of a friends selection input screen of the online social matching service is provided that allows a subscriber to select which of the subscriber's friends on Facebook to invite to view/check out a selected match as similarly described above.

Figure 6:
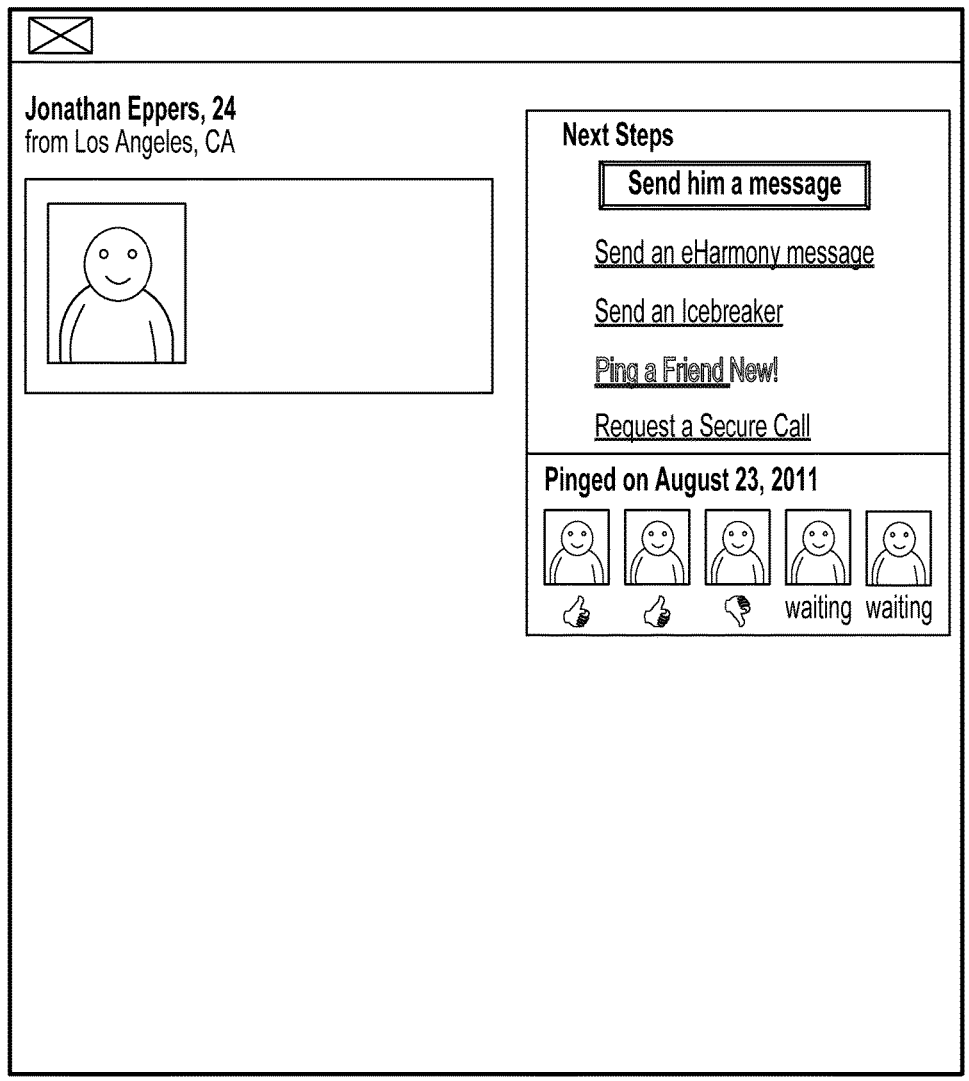
FIG. 6 is a functional screen diagram for social matching in accordance with some embodiments.

FIG. 6 is a functional screen diagram for social matching in accordance with some embodiments. As shown, a ping status screen of the online social matching service shows a status of each of a subscriber's friends social matching feedback input.

Figure 7:
FIG. 7 is a functional screen diagram for social matching in accordance with some embodiments.

FIG. 7 is a functional screen diagram for social matching in accordance with some embodiments. As shown, a browse by matches screen of the online social matching service shows pinged friends received social matching feedback input.

Figure 8:
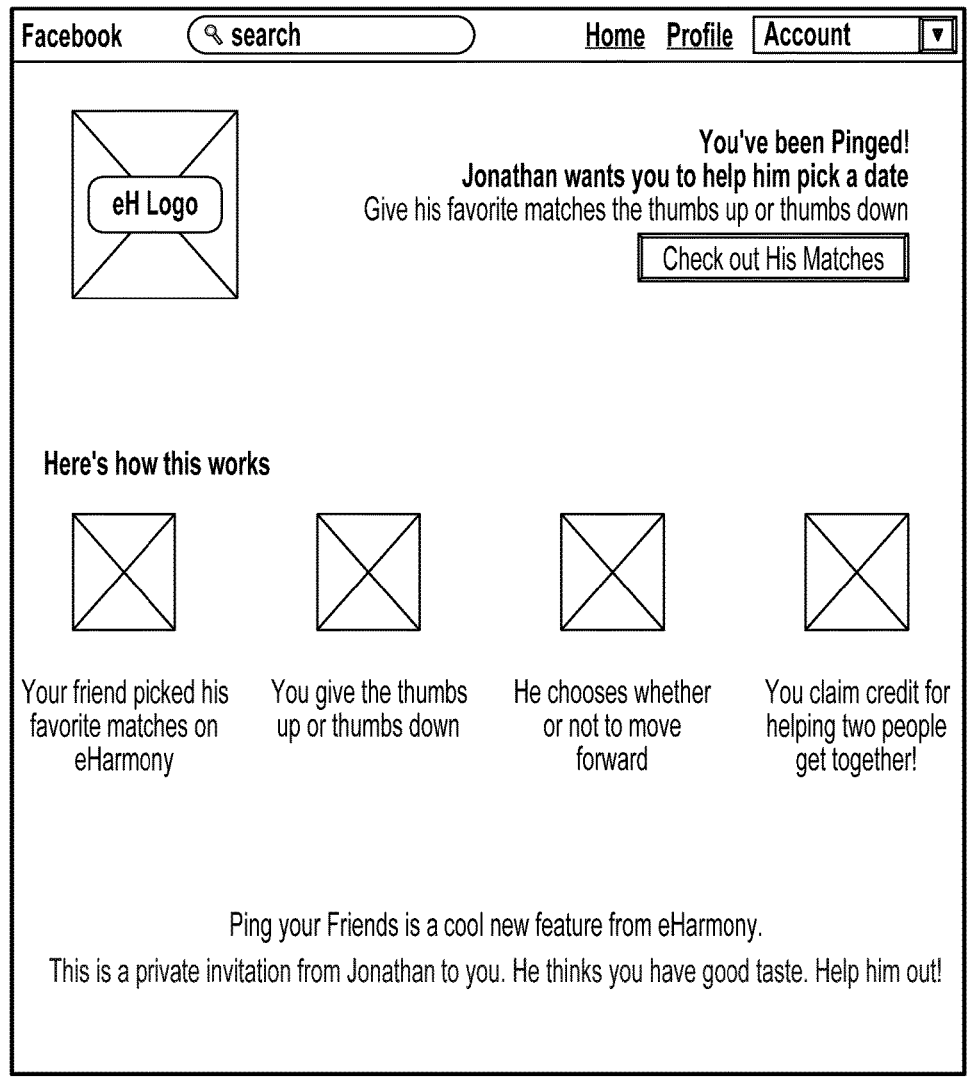
FIG. 8 is a functional screen diagram for social matching in accordance with some embodiments.

FIG. 8 is a functional screen diagram for social matching in accordance with some embodiments. As shown, a screen shot of a Facebook app for the online matching service includes a notification to a Facebook user that one of their Facebook friends has pinged them requesting social matching feedback input regarding the subscriber's shared matches and, specifically, includes a "Check out His Matches" button to view the subscriber's shared matches and to provide such requested social matching feedback input.

Figure 9:
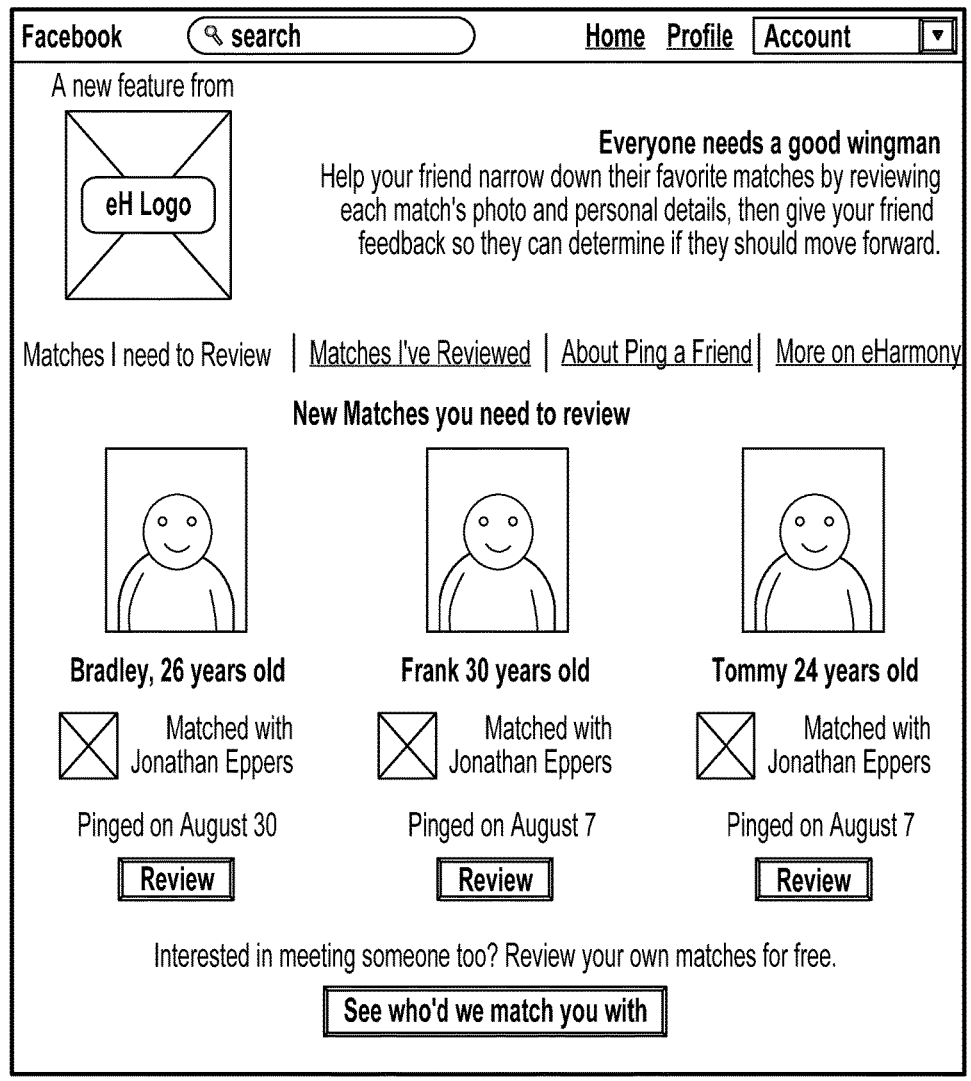
FIG. 9 is a functional screen diagram for social matching in accordance with some embodiments.

FIG. 9 is a functional screen diagram for social matching in accordance with some embodiments. As shown, another screen shot of the Facebook app for the online matching service includes a listing of the shared matches that the Facebook user has been pinged for requested social matching feedback input and, specifically, includes a "Review" button to view each the shared matches and to provide such requested social matching feedback input.

Figure 10:
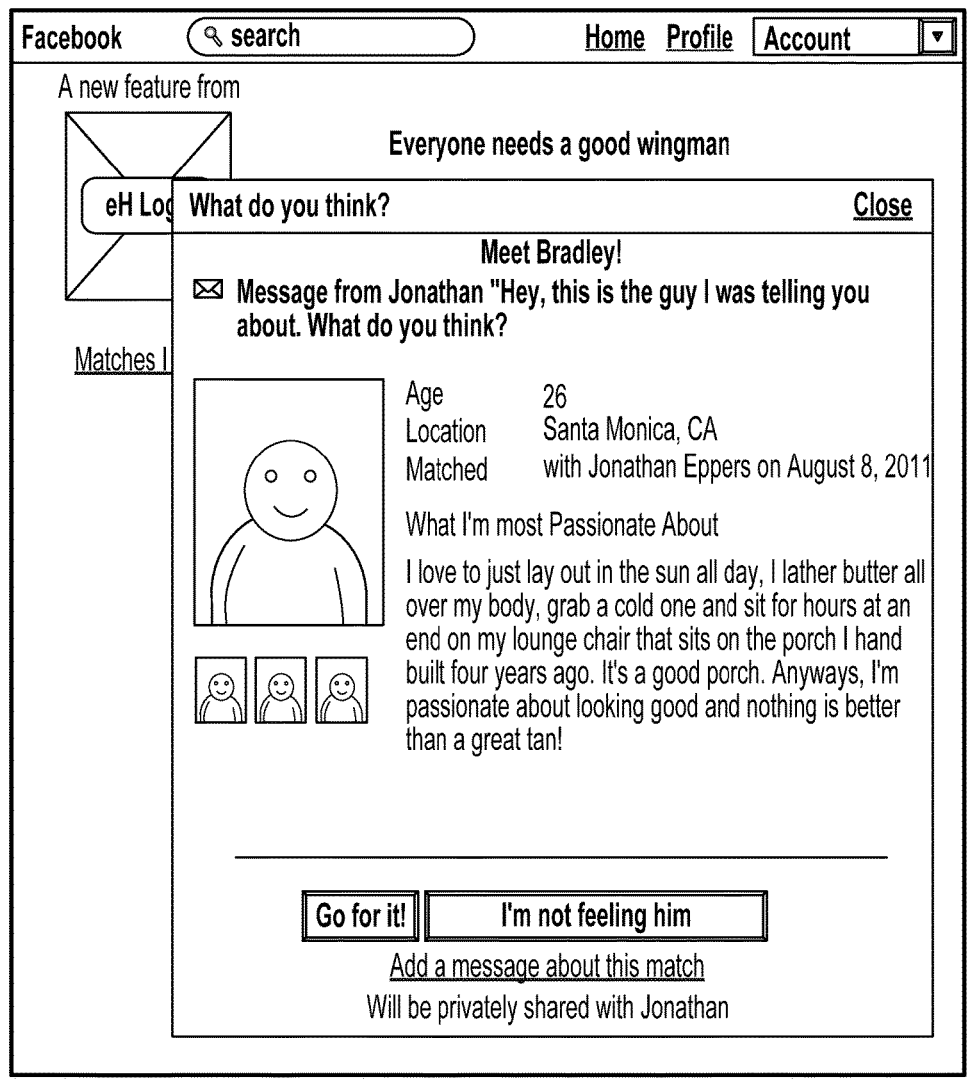
FIG. 10 is a functional screen diagram for social matching in accordance with some embodiments.

FIG. 10 is a functional screen diagram for social matching in accordance with some embodiments. As shown, another screen shot of the Facebook app for the online matching service includes a detailed listing of a selected shared matches that the Facebook user has been pinged for requested social matching feedback input and, specifically, includes a "Go for it!" button and an "I'm not feeling him" button to provide such requested social matching feedback input for the displayed shared match.

Figure 11:
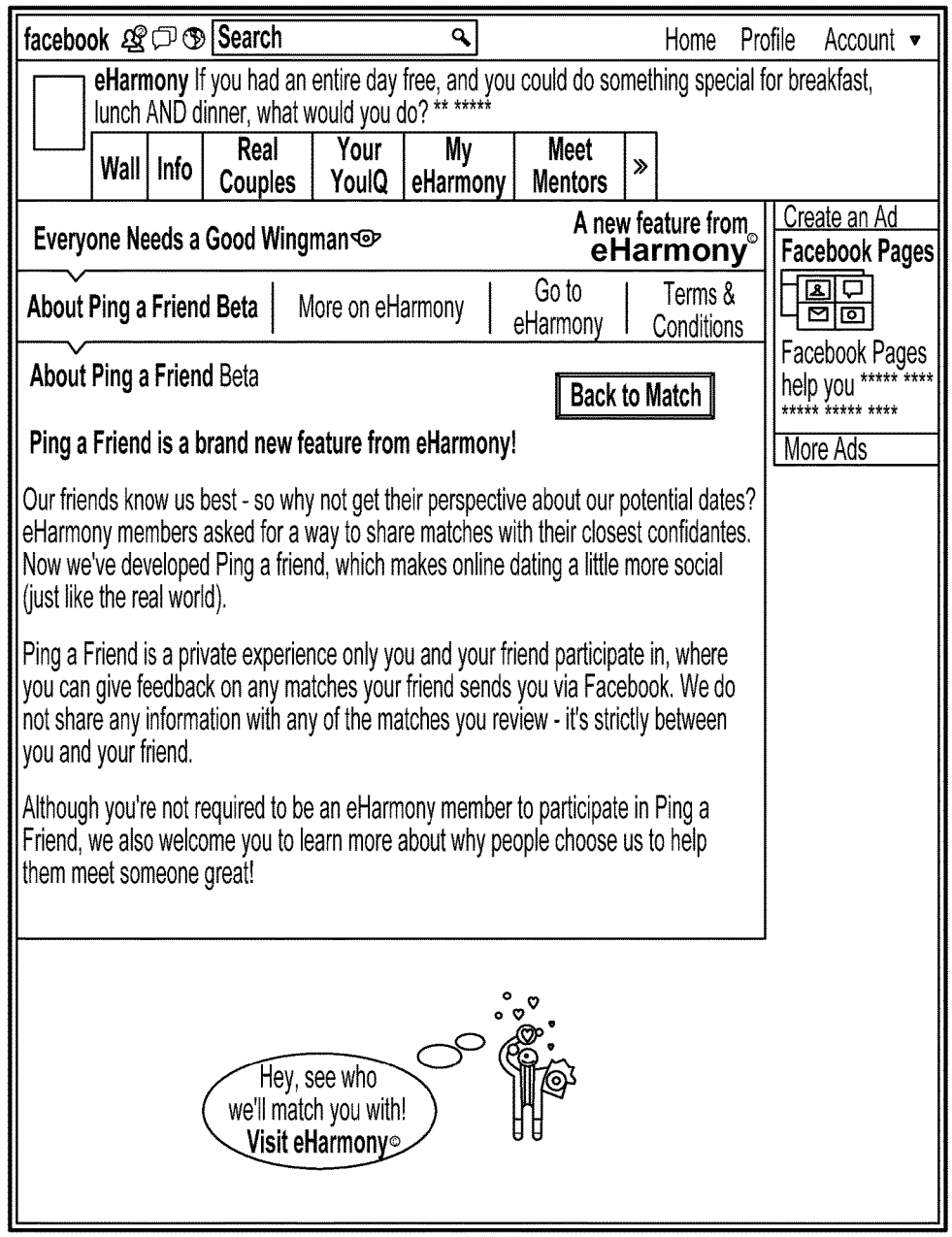
FIG. 11 is a functional screen diagram for social matching in accordance with some embodiments.

FIG. 11 is a functional screen diagram for social matching in accordance with some embodiments. As shown, another screen shot of the Facebook app for the online matching service includes detailed information about the ping a friend feature for the online social matching service.

Figure 12:
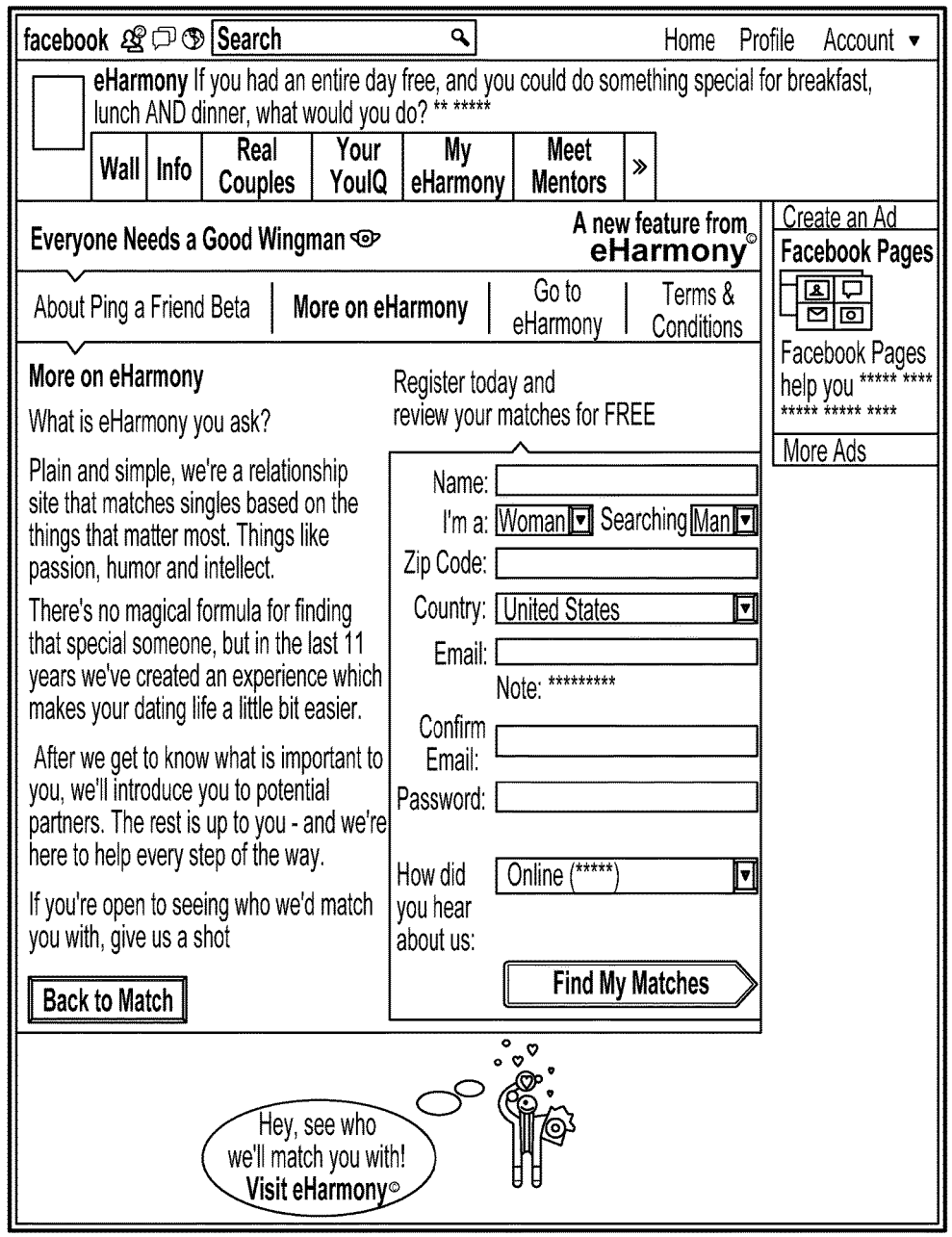
FIG. 12 is a functional screen diagram for social matching in accordance with some embodiments.

FIG. 12 is a functional screen diagram for social matching in accordance with some embodiments. As shown, another screen shot of the Facebook app for the online matching service includes a new subscriber registration form allowing Facebook app users (e.g., pinged users for social matching feedback input) to become new subscribers of online social matching service.

Figure 13:
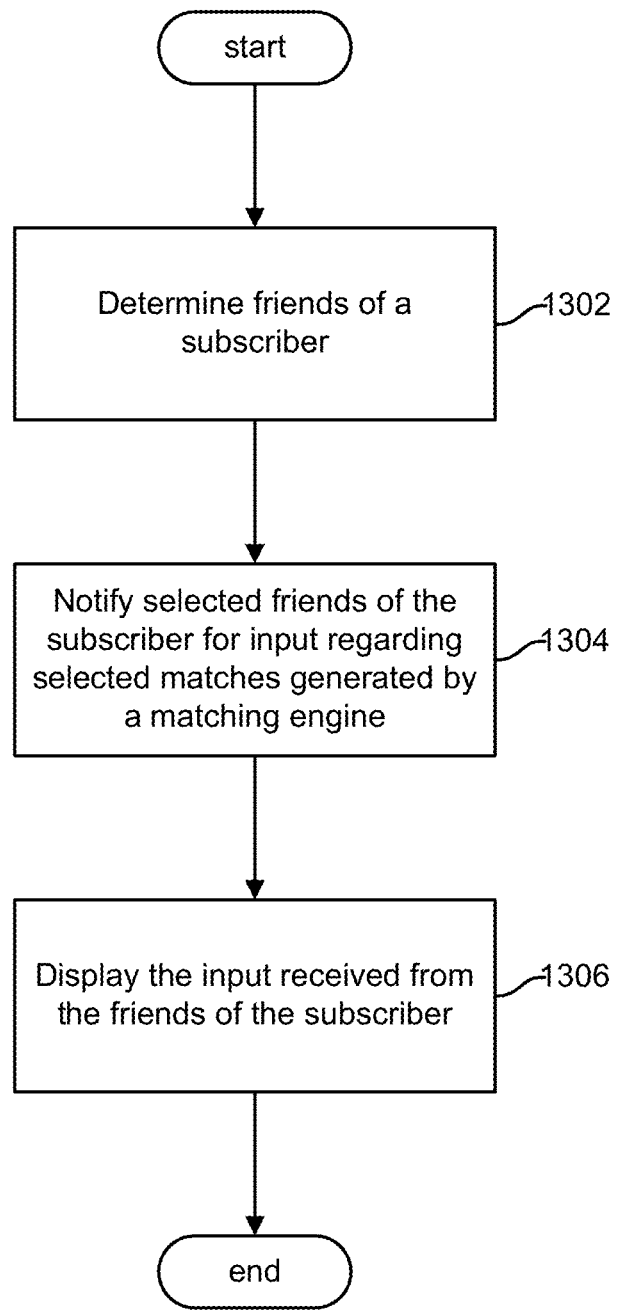
FIG. 13 is a flow diagram for social matching in accordance with some embodiments.

FIG. 13 is a flow diagram for social matching in accordance with some embodiments. At 1302, determining one or more friends of a subscriber is performed. In some embodiments, the one or more friends of the subscriber are associated with the subscriber based on a social graph (e.g., imported or accessed via a social network that generates or maintains the social graph). At 1304, notifying (e.g., pinging) a selected set of the one or more friends of the subscriber for input regarding selected matches for the subscriber is performed. In some embodiments, matches for the subscriber are generated by a matching engine performed by a processor. At 1306, displaying the input received from the selected set of the one or more friends of the subscriber is performed.

Figure 14:
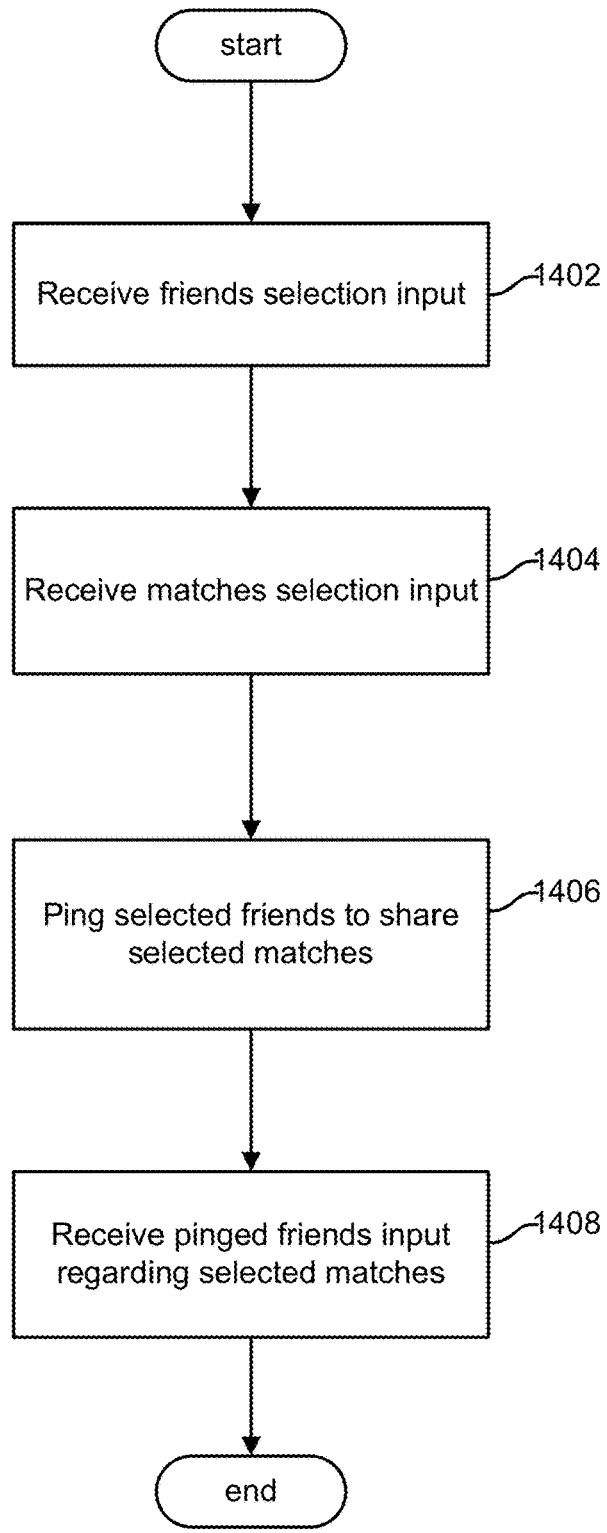
FIG. 14 is another flow diagram for social matching in accordance with some embodiments.

FIG. 14 is another flow diagram for social matching in accordance with some embodiments. At 1402, a friends selection input is received to identify the selected set of the one or more friends of the subscriber for input regarding selected matches for the subscriber. At 1404, a match selection input is received to identify the selected matches for the subscriber to share with the selected set of the one or more friends. At 1406, pinging the selected set of the one or more friends of the subscriber for input regarding selected matches for the subscriber friends to share the selected set of the one or more friends of the subscriber for input regarding selected matches for the subscriber is performed. At 1408, input from the selected set of the one or more friends regarding selected matches is received.

Figure 15:
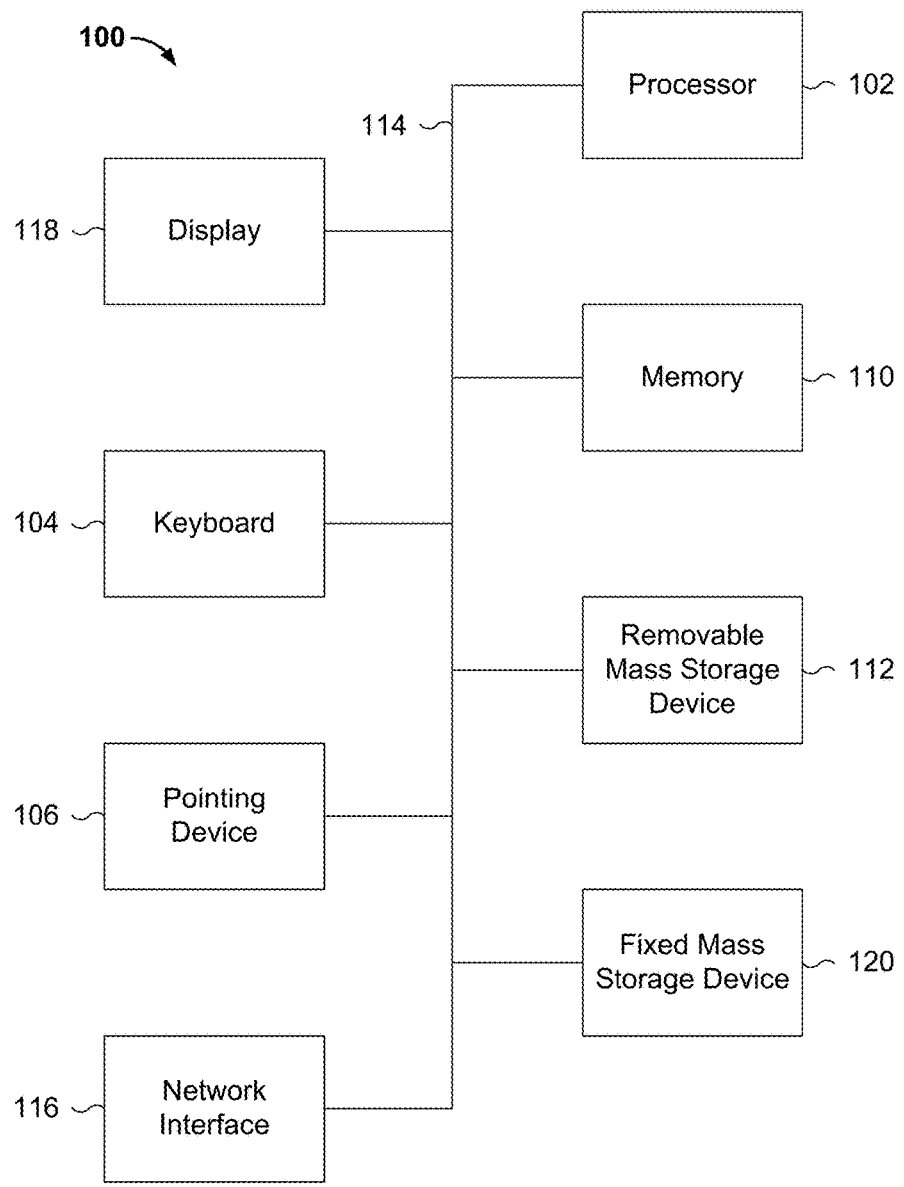
FIG. 15 is a functional diagram illustrating a programmed computer system for providing social matching in accordance with some embodiments.

FIG. 15 is a functional diagram illustrating a programmed computer system for providing social matching in accordance with some embodiments. As shown, FIG. 15 provides a functional diagram of a general purpose computer system programmed to perform providing social matching in accordance with some embodiments. As will be apparent, other computer system architectures and configurations can be used to perform context-sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements and/or executes/performs the processes described below with respect to FIGS. 1 through 14.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable non-transitory computer readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100, and is coupled either bidirectionally (read/write) or unidirectionally (read only) to processor 102. For example, storage 112 can also include computer-readable media such as magnetic tape, flash memory, PC cards, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of primary storage 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems, as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection, as shown. For example, through the network interface 116, the processor 102 can receive information (e.g., data objects or program instructions), from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch sensitive displays, transducer card readers, tape readers, voice or handwriting recognizers, biometric readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: all the media mentioned above, magnetic media such as hard disks, floppy disks, and magnetic tape, optical media such as CD-ROM disks, magneto-optical media such as optical disks, and specially configured hardware devices, such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 15 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized (e.g., server devices, appliances with hardware configured for specific functions, such as a web server or an application server, and/or various other types of computing devices that can execute various operating systems and/or virtual machine software techniques).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine one or more friends of a subscriber, wherein the one or more friends of the subscriber are associated with the subscriber based on a social graph, wherein the social graph is imported from a social network, and wherein the determining of the one or more friends includes to:
receive login credentials from the one or more friends to login into an online matching service, wherein the login credentials include temporary login credentials provided by the online matching service or login credentials of a registered user of the online matching service;
upon the one or more friends logging into the online matching service, determine access levels of the one or more friends of the subscriber to determine a shared set of access rights to a subscriber's online matching service information, comprising to:

determine whether a first friend of the one or more friends belongs to a first access level or a second access level;

in the event that the first friend belongs to the first access level, restrict access to the subscriber's online matching service information with the first friend to obtain a first set of access rights to the subscriber's online matching service information with the first friend; and in the event that the first friend belongs to the second access level, restrict access to the subscriber's online matching service information with the first friend to obtain a second set of access rights to the subscriber's online matching service information with the first friend, the first set of access rights being different from the second set of access rights, wherein the first and second sets of access rights both include at least two of the following to:

view the subscriber's profile, provide input to the subscriber's profile, view the subscriber's potential matches, or share photos, contact information, friends, connections, matches, input from other friends regarding matches, selected matches, past selected matches, correspondence with matches, or any combination thereof; and select a set of the one or more friends on a social network from the determined one or more friends based on the shared set of access rights to provide input on the potential matches;

notify the selected set of the one or more friends of the subscriber for input regarding selected matches for the subscriber, wherein matches for the subscriber are generated by a matching engine performed by a processor, wherein the notifying of the selected set of the one or more friends comprises to:

provide, to the one or more friends, temporary login credentials for an online matching service in the event that the one or more friends are not a current subscriber to the online matching service;

determine whether the subscriber has a connection or common friend with a match of the selected matches based on the social graph;

in the event that the subscriber has a connection or common friend with the match of the selected matches, send a request to the connection or common friend to provide a testimonial on the match; and receive input regarding the match from the connection or common friend;

display the input received from the selected set of the one or more friends of the subscriber; and generate a new match based on the received input from the selected set; selected set, wherein the new match corresponds to an additional set of matches; and a memory coupled to the processor and configured to provide the processor with instructions.

2. The system recited in claim 1, wherein the processor is further configured to:

receive a friends selection input to identify the selected set of the one or more friends of the subscriber for input regarding selected matches for the subscriber;

receive a match selection input to identify the selected matches for the subscriber to share with the selected set of the one or more friends; and ping the selected set of the one or more friends of the subscriber for input regarding selected matches for the subscriber friends to share the selected set of the one or more friends of the subscriber for input regarding selected matches for the subscriber.

3. The system recited in claim 1, wherein the processor is further configured to:

receive a suggested match from a friend of the subscriber.

4. The system recited in claim 1, wherein the processor is further configured to:

receive a suggested match from a friend of the subscriber, wherein the suggested match is based on the match that was previously suggested to the friend.

5. The system recited in claim 1, wherein the processor is further configured to:

receive a suggested match from a friend of the subscriber, wherein the suggested match is based on the match that was previously sent to the friend as a ping request for input from another subscriber.

6. The system recited in claim 1, further comprising:

selecting another set of friends based on the determined access levels to review the matches but not provide input.

7. The system recited in claim 1, wherein the subscriber's profile includes photos, contact information, friends/connections, matches, input from other friends regarding matches, selected matches, past selected matches, correspondence with matches, or any combination thereof.

8. The system recited in claim 1, wherein the online matching service relates to an online dating service or an Internet dating service.

9. The system recited in claim 1, wherein the first and second sets of access rights both include at least three of the following to:

view the subscriber's profile, provide input to the subscriber's profile, view the subscriber's potential matches, or share photos, contact information, friends, connections, matches, input from other friends regarding matches, selected matches, past selected matches, correspondence with matches, or any combination thereof.

10. A computer program product, the computer program product being embodied in a tangible non-transitory computer readable storage medium and comprising computer instructions for:

determining one or more friends of a subscriber, wherein the one or more friends of the subscriber are associated with the subscriber based on a social graph, wherein the social graph is imported from a social network, and wherein the determining of the one or more friends includes:

receiving login credentials from the one or more friends to login into an online matching service, wherein the login credentials include temporary login credentials provided by the online matching service or login credentials of a registered user of the online matching service;

upon the one or more friends logging into the online matching service, determining access levels of the one or more friends of the subscriber to determine a shared set of access rights to a subscriber's online matching service information, comprising:

determining whether a first friend of the one or more friends belongs to a first access level or a second access level;

in the event that the first friend belongs to the first access level, restricting access to the subscriber's online matching service information with the first friend to obtain a first set of access rights to the subscriber's online matching service information with the first friend; and in the event that the first friend belongs to the second access level, restricting access to the subscriber's online matching service information with the first friend to obtain a second set of access rights to the subscriber's online matching service information with the first friend, the first set of access rights being different from the second set of access rights, wherein the first and second sets of access rights both include at least two of the following to:
view the subscriber's profile,
provide input to the subscriber's profile,
view the subscriber's potential matches, or
share photos, contact information, friends, connections, matches, input from other friends regarding matches, selected matches, past selected matches, correspondence with matches, or any combination thereof; and selecting a set of the one or more friends on a social network from the determined one or more friends based on the shared set of access rights to provide input on the potential matches;

notifying the selected set of the one or more friends of the subscriber for input regarding selected matches for the subscriber, wherein matches for the subscriber are generated by a matching engine performed by a processor, wherein the notifying of the selected set of the one or more friends comprises:
providing, to the one or more friends, temporary login credentials for an online matching service in the event that the one or more friends are not a current subscriber to the online matching service;
determining whether the subscriber has a connection or common friend with a match of the selected matches based on the social graph;
in the event that the subscriber has a connection or common friend with the match of the selected matches, sending a request to the connection or common friend to provide a testimonial on the match; and
receiving input regarding the match from the connection or common friend;

displaying the input received from the selected set of the one or more friends of the subscriber; and generating a new match based on the received input from the selected set, wherein the new match corresponds to an additional set of matches.

11. The computer program product recited in claim 10, further comprising computer instructions for:
receiving a friends selection input to identify the selected set of the one or more friends of the subscriber for input regarding selected matches for the subscriber;
receiving a match selection input to identify the selected matches for the subscriber to share with the selected set of the one or more friends; and
pinging the selected set of the one or more friends of the subscriber for input regarding selected matches for the subscriber friends to share the selected set of the one or more friends of the subscriber for input regarding selected matches for the subscriber.

12. The computer program product recited in claim 10, further comprising computer instructions for:
receive a suggested match from a friend of the subscriber.

13. The computer program product recited in claim 10, further comprising computer instructions for:
receive a suggested match from a friend of the subscriber, wherein the suggested match is based on the match that was previously suggested to the friend.

14. The computer program product recited in claim 10, further comprising computer instructions for:
receive a suggested match from a friend of the subscriber, wherein the suggested match is based on the match that was previously sent to the friend as a ping request for input from another subscriber.

15. A computer implemented method, comprising:
determining one or more friends of a subscriber, wherein the one or more friends of the subscriber are associated with the subscriber based on a social graph, wherein the social graph is imported from a social network, and wherein the determining of the one or more friends includes:
receiving login credentials from the one or more friends to login into an online matching service, wherein the login credentials include temporary login credentials provided by the online matching service or login credentials of a registered user of the online matching service;
upon the one or more friends logging into the online matching service, determining access levels of the one or more friends of the subscriber to determine a shared set of access rights to a subscriber's online matching service information, comprising:
determining whether a first friend of the one or more friends belongs to a first access level or a second access level;
in the event that the first friend belongs to the first access level, restricting access to the subscriber's online matching service information with the first friend to obtain a first set of access rights to the subscriber's online matching service information with the first friend; and
in the event that the first friend belongs to the second access level, restricting access to the subscriber's online matching service information with the first friend to obtain a second set of access rights to the subscriber's online matching service information with the first friend, the first set of access rights being different from the second set of access rights, wherein the first and second sets of access rights both include at least two of the following to:
view the subscriber's profile,
provide input to the subscriber's profile,
view the subscriber's potential matches, or
share photos, contact information, friends, connections, matches, input from other friends regarding matches, selected matches, past selected matches, correspondence with matches, or any combination thereof; and
selecting a set of the one or more friends on a social network from the determined one or more friends based on the shared set of access rights to provide input on the potential matches;
notifying the selected set of the one or more friends of the subscriber for input regarding selected matches for the subscriber, wherein matches for the subscriber are generated by a matching engine performed by a processor, wherein the notifying of the selected set of the one or more friends comprises:
providing, to the one or more friends, temporary login credentials for an online matching service in the event that the one or more friends are not a current subscriber to the online matching service;

determining whether the subscriber has a connection or common friend with a match of the selected matches based on the social graph;

in the event that the subscriber has a connection or common friend with the match of the selected matches, sending a request to the connection or common friend to provide a testimonial on the match; and receiving input regarding the match from the connection or common friend; and displaying the input received from the selected set of the one or more friends of the subscriber; and generating a new match based on the received input from the selected set, wherein the new match corresponds to an additional set of matches.

16. The computer implemented method recited in claim 15, further comprising:

receiving a friends selection input to identify the selected set of the one or more friends of the subscriber for input regarding selected matches for the subscriber;

receiving a match selection input to identify the selected matches for the subscriber to share with the selected set of the one or more friends; and pinging the selected set of the one or more friends of the subscriber for input regarding selected matches for the subscriber friends to share the selected set of the one or more friends of the subscriber for input regarding selected matches for the subscriber.

17. The computer implemented method recited in claim 15, further comprising:

receive a suggested match from a friend of the subscriber.

18. The computer implemented method recited in claim 15, further comprising:

receive a suggested match from a friend of the subscriber, wherein the suggested match is based on the match that was previously suggested to the friend.

19. The computer implemented method recited in claim 15, further comprising:

receive a suggested match from a friend of the subscriber, wherein the suggested match is based on the match that was previously sent to the friend as a ping request for input from another subscriber.

20. A system, comprising:

a processor configured to:

receive a shared match for a subscriber that is to be shared with a friend of the subscriber, wherein the friend and the subscriber are associated with each other based on a social graph generated by a social network executed on a processor, and wherein the social graph is imported from the social network;

receive login credentials from the friend to login into an online matching service, wherein the login credentials include temporary login credentials provided by the online matching service or login credentials of a registered user of the online matching service;

upon the friend logging into the online matching service, determine an access level of the friend of the subscriber to determine a shared set of access rights to a subscriber's online matching service information, comprising to:

determine whether the friend belongs to a first access level or a second access level;

in the event that the friend belongs to the first access level, restrict access to the subscriber's online matching service information with the first friend to obtain a first set of access rights to the subscriber's online matching service information with the friend; and in the event that the friend belongs to the second access level, restrict access to the subscriber's online matching service information with the first friend to obtain a second set of access rights to the subscriber's online matching service information with the friend, the first set of access rights being different from the second set of access rights, wherein the first and second sets of access rights both include at least two of the following to:

view the subscriber's profile, provide input to the subscriber's profile, view the subscriber's potential matches, or share photos, contact information, friends, connections, matches, input from other friends regarding matches, selected matches, past selected matches, correspondence with matches, or any combination thereof;

notify the friend of the shared match for the subscriber requesting input regarding the shared matches for the subscriber in the event that the determined access level of the friend exceeds a predetermined threshold, wherein shared match for the subscriber was generated by a matching engine of an online matching service, wherein the notifying of the friend comprises to:

provide, to the friend, temporary login credentials for an online matching service in the event that the friend is not a current subscriber to the online matching service;

determine whether the friend of the shared match is a connection or common friend of the subscriber based on the social graph;

in the event that the friend of the shared match is a connection or common friend with the subscriber, send a request to the connection or common friend of the subscriber to provide a testimonial on the shared match; and receive input regarding the shared match from the connection or common friend of the subscriber;

display the input screen for receiving social matching feedback input from the friend for the shared match for the subscriber; and generate a new match based on the received input from the friend, wherein the new match corresponds to an additional set of matches; and a memory coupled to the processor and configured to provide the processor with instructions.

* * * * *